United States Patent [19]

Werthmann

[11] Patent Number: 5,035,384
[45] Date of Patent: Jul. 30, 1991

[54] SUPPORT CLIP AND METHOD OF USE

[76] Inventor: Paul E. Werthmann, 530 Alyce La., Aurora, Ill. 60505

[21] Appl. No.: 369,608

[22] Filed: Jun. 21, 1989

[51] Int. Cl.⁵ .............................................. F16B 7/00
[52] U.S. Cl. .................................. 248/74.2; 248/230; 24/339; 403/233
[58] Field of Search ............... 248/74.2, 66, 230, 541, 248/229, 214, 540, 121, 300, 231.8, 316.7; 24/339, 336; 403/237, 233, 230

[56] References Cited

U.S. PATENT DOCUMENTS

| | | | |
|---|---|---|---|
| 474,584 | 5/1892 | Tobey | 403/233 X |
| 1,070,948 | 8/1913 | Dodd | 403/233 X |
| 1,541,326 | 6/1925 | Clough | 403/233 X |
| 2,145,910 | 2/1939 | Alpen | 24/336 X |
| 3,425,127 | 2/1969 | Long et al. | 248/230 |
| 4,309,120 | 1/1982 | Werthmann | 24/339 X |

FOREIGN PATENT DOCUMENTS 0537569  6/1941  United Kingdom ................. 24/339
1556730 11/1979  United Kingdom ............... 403/233

Primary Examiner—Karen J. Chotkowski
Attorney, Agent, or Firm—Augustus G. Douvas

[57] ABSTRACT

A clip for supporting a construction guide tube on a stringline rod which is adjustably clamped to a ground stake. The clip has a curved saddle shaped in the form of an approximate semi-circle. The saddle is sized to receive and retain the tube with a relatively tight press fit. The saddle is integrally attached to a tubular socket which is part of the clip. The socket has a bore sized for relatively tight insertion on the stringline rod. A method for using a plurality of the clips to form a curved guide is also described.

3 Claims, 1 Drawing Sheet

SUPPORT CLIP AND METHOD OF USE

This invention relates to a support clip, and in particular to a clip for supporting a flexible elongated element which is to serve as a curved construction guide for a machine.

BACKGROUND OF THE INVENTION

A stringline is often employed in the prior art as a guide for an automatic machine control used in construction work. The stringline must be properly disposed both horizontally and vertically so that the machine under control will be accurately guided along a required path.

In general, a stringline is supported on a stringline rod, which is usually horizontally disposed and formed with a stringline engaging groove. The stringline rod is clamped to a vertically disposed ground stake by an adjustable clamp.

A plurality of spaced stringline rods with their grooves aligned on the guide locus hold the stringline on the proper guide path. This prior art arrangement is satisfactory for straight-line guides, or large-radius curves; but for guide curves having a relatively small radius, such as a small circle, the guide path is defined in a series of straight-line-segments. These straight-line segments cause the guided machine to similarly operate in corresponding straight-line segments. The resulting construction is unsatisfactory for high quality specifications.

In certain construction situations, the supervising foreman will attempt to minimize the effect of the straight-line segments by very closely spacing the ground stakes and their supported stringline rods. This alternative is time consuming and therefore costly.

SUMMARY OF THE INVENTION

Accordingly, a principal object of this invention is to provide an improved method and apparatus for establishing curved guides for automatic machine controls used in construction work.

Another object is to provide a suuport clip which may be used with conventional stringline rods to establish a curved guide for a machine.

Another object is to duplicate with greater accuracy a curved guide path.

Another object is to provide a simple, inexpensive support clip for an elongated flexible element, such as a plastic tube or rod.

Another object is to reduce the time and expense required to establish a construction guide.

Another object is to provide an improved construction guide which is in part a stringline and in part an elongated flexible element, such as a tube.

A principal novel element of this invention features a support clip. The clip carries a flexible plastic tube on a stringline rod which is adjustably clamped to a ground stake. The clip has a curved saddle shaped in the form of a semi-circle. The saddle is sized to receive and retain the tube with a press fit. The clip also has a tubular socket integrally attached to the saddle with the socket having a bore sized for relatively tight insertion on the stringline rod.

The clip is locked to the stringline rod by mating a depression groove formed on the tubular socket with the conventional line groove formed in a stringline rod.

DESCRIPTION OF THE DRAWINGS

In order that all of the structural features for attaining the objects of this invention may be understood, reference is made to the following drawings.

DETAILED DESCRIPTION OF THE INVENTION

Figure 1:
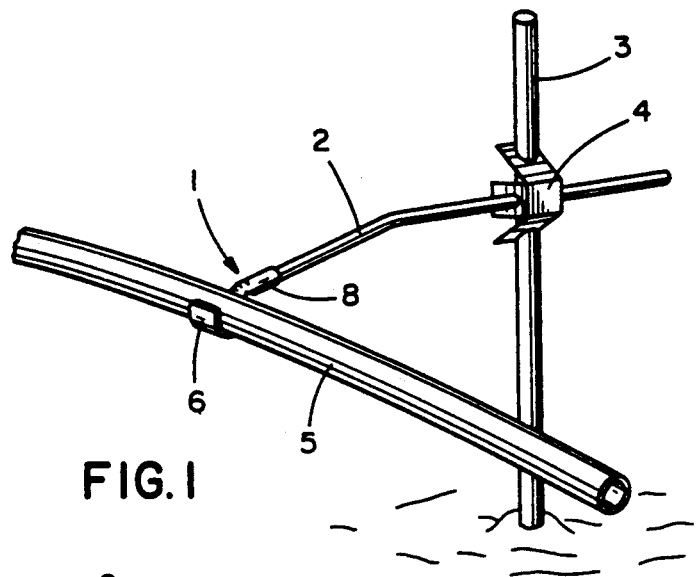
FIG. 1 is a view of the support clip of this invention supporting a flexible plastic guide tube on a stringline rod which is adjustably clamped to a construction stake.
Figure 3:
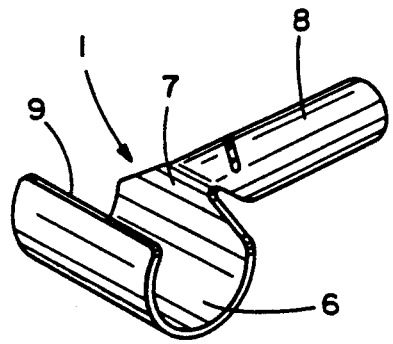
FIG. 3 is a perspective view of the support clip.

Referring to the drawings, support clip 1 (FIG. 3) is shown applied to a stringline rod 2 (FIG. 1) which is adjustably clamped to ground stake 3 by a compound clamp 4. Clamp 4 is the subject matter of the inventor's U.S. Pat. No. 4,309,120 issued Jan. 5, 1982.

Figure 4:
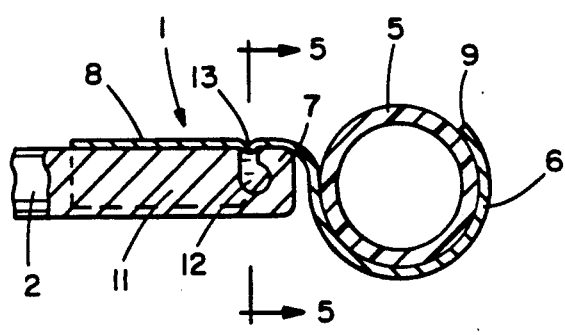
FIG. 4 is a section view taken along line 4—4 of FIG. 2 which shows a clip lock formed by mating a conventional stringline groove and a depression groove formed on the tubular socket of the clip.

Guide tube 5 is supported on clip 1 (FIGS. 1, 2 and 4) by seating the tube in the semi-circle shaped saddle 6 (FIG. 4). Tube 5 is preferably a flexible plastic tube; alternatively a flexible rod of metal or plastic may be substituted for tube 5.

Figure 2:
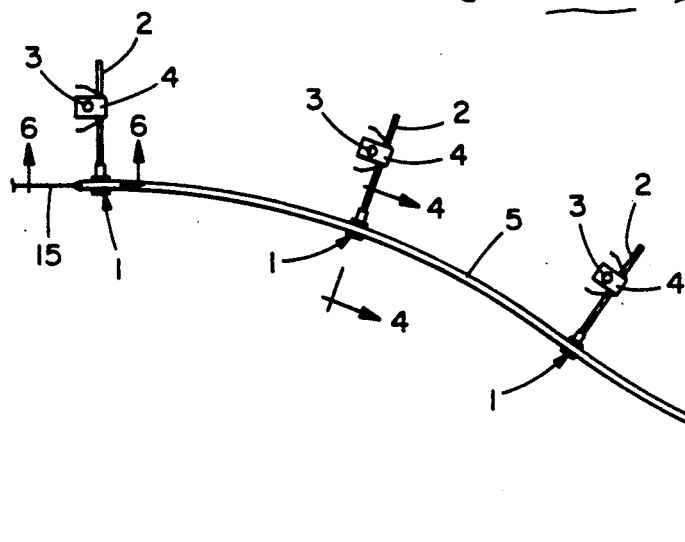
FIG. 2 is a view which shows the use of a plurality of support clips to support a plastic guide tube in the shape of a curve.

Because of the flexible nature of tube 5, or its equivlent rod substitute, a smooth curve—devoid of straight-line segments—is formed when tube 5 is seated in a plurality of spaced clips 1 as is shown in FIG. 2.

Saddle 6 is sized to receive and retain tube 5 with a relatively tight press fit. As is best shown in FIG. 4, saddle 6 is formed in a cross-sectional shape having a rounded inner edge 7 rolled into adjacent tubular socket 8, and an opposing generally straight edge 9. The cross-sectional periphery of saddle 6 is preferably somewhat greater than a semi-circle so that tube 5 is snapped into place and also firmly retained.

Figure 5:
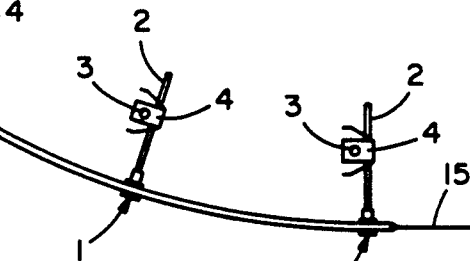
FIG. 5 is a section view taken along line 5—5 of FIG. 4 showing details of the clip lock.

Tubular slotted socket 8 is integrally attached to saddle 6 preferably in a one-piece metal construction. Socket 8 is formed with a bore sized for relatively tight insertion on stringline rod 2. Socket 8 is formed with an elongated slot 10 (FIG. 5) which enables the socket to clamp tightly on stringline rod 2.

The end 11 of rod 2 adjacent clip 1 is formed with a conventional stringline retaining groove 12, because this type of rod is commonly available at most construction sites.

Socket 8 of clip 1 may thus be advantageously formed with a depression groove 13 so located to mate with and lock upon groove 12. Thus clip 1 is firmly retained on end 11 of rod 2 so that the tendency of tube 5 to "straighten-out" does not dislodge clip 1 from a coupled position on rod 2.

Figure 6:
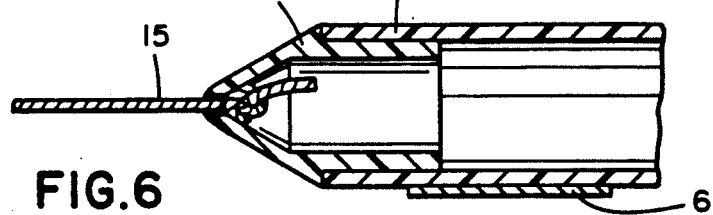
FIG. 6 is a section view taken along line 6—6 of FIG. 2 showing a conical adaptor seated over an end of the plastic guide tube with the adaptor holding a stringline.

Conical adapter 14 (FIG. 6) is inserted into the end bore of tube 5 whenever it is desired to define a portion of the guide path with a stringline extension 15. Thus this invention enables one readily to form a composite guide partly of flexible tube or rod and the remaining portion of stringline.

It should be understood that variations and modifications can be made in the above-described method and apparatus without departing from the scope of the invention.

What is claimed is:

1. A combination for guiding a moving construction device comprising a construction ground stake, a stringline rod adjustably clamped to the ground stake, a flexible tube for guiding the moving construction device, and a clip supporting the construction guide tube on the stringline rod with the clip having a curved saddle shaped in the form of an approximate semi-circle and sized to receive and retain the tube and also having a tubular socket integrally attached to the saddle with the socket having a bore sized to receive an inserted end of the stringline rod.

2. The combination of claim 1 in which the stringline rod is formed with a stringline retaining groove, and the tubular socket is formed with a depression groove sized to mate with the stringline retaining groove by moving the clip on the stringline rod to thereby lock the clip on the string-line rod.

3. The combination of claim 2 in which the depression groove has a relatively small circumferential length compared with the peripheral circumference of the tubular socket.

* * * * *